Nov. 4, 1958 R. BERGSMA 2,858,918
PINION AND IDLER GEAR FOR RATCHET ASSEMBLY
Filed Jan. 11, 1956
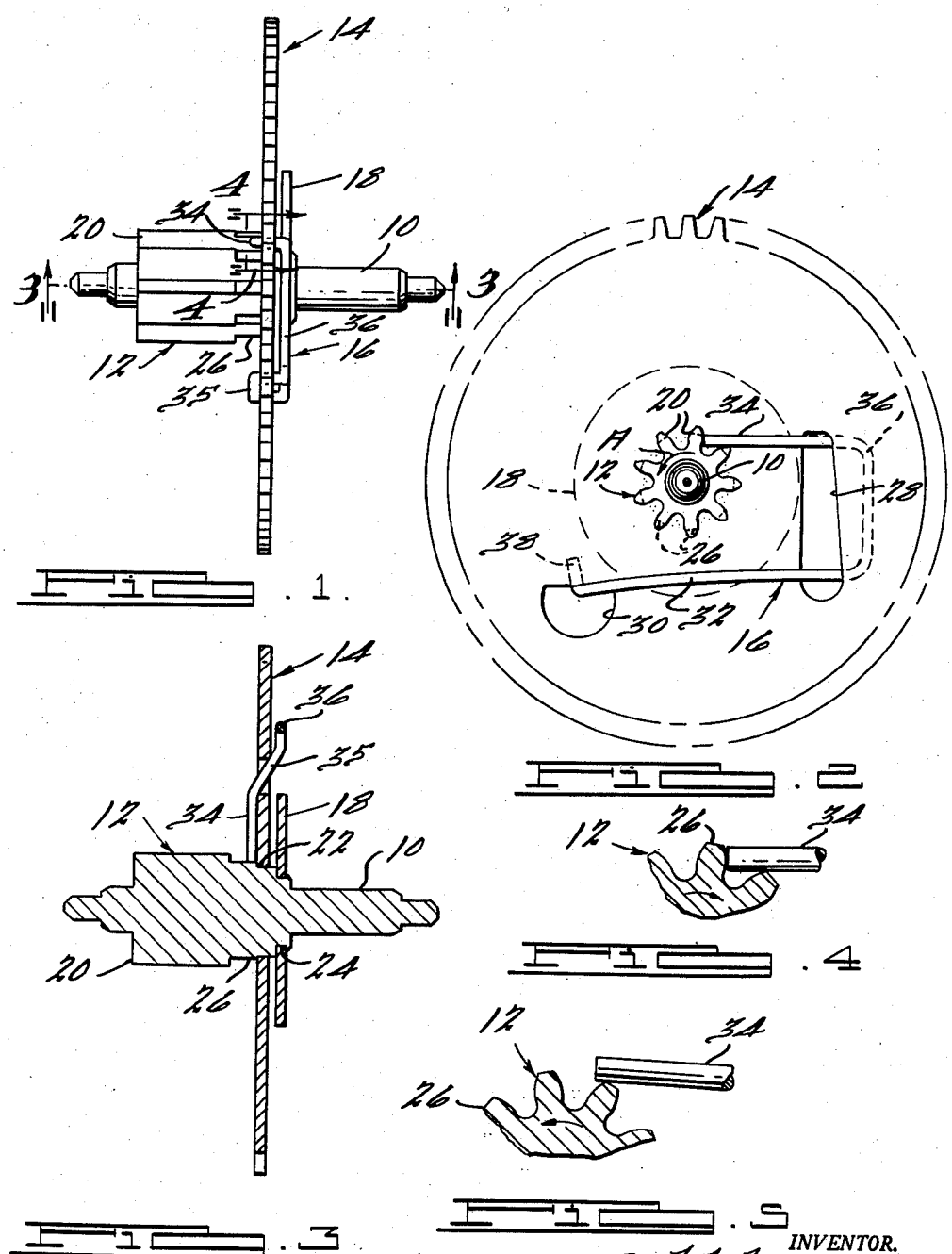
INVENTOR.
Rudolph Bergsma
BY
Harness, Dickey & Pierce
ATTORNEYS

United States Patent Office 2,858,918
Patented Nov. 4, 1958

2,858,918

PINION AND IDLER GEAR FOR RATCHET ASSEMBLY

Rudolph Bergsma, Ann Arbor, Mich., assignor to King-Seeley Corporation, Ann Arbor, Mich., a corporation of Michigan Application January 11, 1956, Serial No. 558,466

1 Claim. (Cl. 192—46)

The present invention relates to ratchet gear assemblies and more particularly, to a ratchet gear assembly having particular utility in timing mechanisms.

It is an object of the present invention to provide an improved ratchet gear assembly of the above mentioned type which is simple in design, economical of manufacture, and reliable and efficient in operation.

It is a further object of the present invention to provide an improved pinion gear and associated disc gear assembly in which both the pinion gear and the disc gear have teeth adapted to mesh with the teeth of co-operating gears and in which the pinion gear and disc gear are connected by a simple ratchet spring which engages the pinion gear teeth.

It is a further object of the present invention to provide an improved ratchet gear assembly having a minimum number of parts and the design of which facilitates assembly of the parts.

Other and more detailed objects of the present invention will be apparent to those skilled in the art from a consideration of the following specification, the appended claims, and the accompanying drawing, wherein:

Figure 1 is a side elevational view of a gear assembly embodying the present invention;

Figure 2 is an end elevational view of the gear assembly illustrated in Figure 1;

Figure 3 is a sectional view of the structure illustrated in Figure 1 taken along the line 3—3 thereof;

Figure 4 is an enlarged fragmentary sectional view of that portion of the structure illustrated in Figure 2, indicated by the circle 4; and, Figure 5 is an enlarged fragmentary sectional view illustrating a position of the ratchet spring during rotation of the pinion gear relative to the disc gear.

Referring to the drawing, the ratchet gear assembly comprises a shaft 10, a pinion gear 12, a disc gear 14, a ratchet spring 16, and a washer 18. The pinion gear 12, in the preferred embodiment illustrated, is integrally formed on the shaft 10 and is provided with generally involute-shaped teeth 20. At one end of the pinion gear 12, the shaft 10 is provided with an enlarged collar portion 22 upon which the disc gear 14 is mounted for rotation relative to the shaft 10 and pinion gear 12. The shaft 10 is also provided with a second collar portion 24 adjacent the collar portion 22 which receives the washer 18. The washer is fixed to the shaft 10 as by staking. With the parts assembled in this manner, it will be appreciated that, while the disc 14 may rotate relative to the shaft 10, it is held against axial movement in one direction by the pinion gear 12 and is held against movement in the opposite direction by the washer 18. Adjacent the disc gear 14 the teeth 20 of the pinion gear 12 are turned down as indicated at 26, so that a relatively short axially extending portion of the pinion gear 12, adjacent the disc gear 14, has the radially outer portion of the teeth removed.

The disc gear 14 is provided with apertures 28 and 30 through which the ratchet spring 16 extends when mounted on the disc gear 14. The ratchet spring 16 is generally U-shaped and includes a pair of arms 32 and 34 and an interconnecting portion 36. Both of the arms 32 and 34 are offset adjacent the interconnecting portion 36 as indicated at 35, so that the interconnecting portion 36 may be disposed at one side to overlie one face of the disc gear 14 with the offset portions 35 of the arms 32 and 34 extending through the aperture 28 and with the arms 32 and 34 outwardly of these offset portions being disposed to overlie the opposite face of the disc gear 14.

In its assembled position the ratchet spring 16 is disposed with the interconnecting portion 36 overlying the face of the disc gear 14 adjacent the washer 18 and with the arms 32 and 34 outwardly of the offset portions 35 overlying the face of the disc gear 14 adjacent the pinion gear 12. The arm 32 is anchored to the disc gear 14 by an end portion 38 extending through the aperture 30 and overlying the face of the disc gear 14 adjacent the washer 18. The other arm 34 of the ratchet spring 16 extends generally tangentially of the pinion gear 12 and yieldably engages the turned-down tooth portions 26 adjacent the disc gear 14. It will be appreciated that upon rotation of the pinion gear 12 in the direction of the arrow A (Figure 2), the portions 26 may successively move under the arm 34 as illustrated in Figure 5, causing the end portion thereof to deflect slightly outwardly as each shortened tooth passes the end of the arm 34. The deflection necessary to permit such movement is kept to a minimum by shortening the teeth 20, as above described, where they are engaged by the ratchet spring 16. If, however, it is attempted to rotate the pinion gear 12 in the opposite direction, the end of the arm 34 engages the one of the shortened teeth 26 adjacent its radially outer limit, as illustrated in Figure 4, and any rotation of the pinion gear 12 drives the disc gear 14 through the ratchet spring 16.

The ratchet gear assembly above described has particular utility in timing mechanisms in which it may be desired to turn the pinion gear in one direction during winding of the main spring of the timing mechanism, without turning the associated disc gear, which may be an idler gear, while providing a simple construction such that rotation of the pinion gear in the opposite direction, as by the action of the main spring, will produce a corresponding rotation of the associated disc gear. In the above described construction it will be noted that this is accomplished with a minimum of parts and without a separate ratchet gear.

While only one specific embodiment of the present invention has been illustrated and described in detail herein, it will be readily appreciated by those skilled in the art that numerous modifications and changes may be made without departing from the spirit of the invention.

What is claimed is:

A ratchet gear assembly comprising a pinion gear having symmetrical teeth adapted to mesh with the teeth of a cooperating gear, said pinion gear having a portion of short axial extent at which the teeth are relieved so that they are of substantially shorter radial extent, a disc gear mounted in concentric relation with said pinion gear for rotation relative thereto and disposed with one face thereof adjacent said portion of said pinion gear, a ratchet spring mounted on said disc gear and having an end portion terminating in an end face adapted to engage one side of said relieved teeth of said pinion gear, said end portion extending generally tangentially of said portion of said pinion gear and being engaged in spaced relation to said end face by said relieved teeth of said pinion gear and moved out of the path of movement of said relieved teeth during rotation of said pinion gear in one direction relative to said disc gear, said end face of said end portion engaging a side of one of said relieved teeth of said pinion gear to prevent rotation of said pinion gear in the opposite direction relative to said disc gear.

References Cited in the file of this patent

UNITED STATES PATENTS

| | | |
|---|---|---|
| 1,798,918 | Wehinger | Mar. 31, 1931 |
| 2,084,803 | Hart | June 22, 1937 |
| 2,486,043 | Lofgren | Oct. 25, 1949 |
| 2,705,428 | McCullough | Apr. 5, 1955 |

UNITED STATES PATENT OFFICE

CERTIFICATE OF CORRECTION

Patent No. 2,858,918 November 4, 1958

Rudolph Bergsma

It is hereby certified that error appears in the above numbered patent requiring correction and that the said Letters Patent should read as corrected below.

In the drawing, line 2, and in the heading to the printed specification, lines 2 and 3, title of invention, for "PINION AND IDLER GEAR FOR RATCHET ASSEMBLY" read -- PINION AND IDLER GEAR RATCHET ASSEMBLY --.

Signed and sealed this 3rd day of February 1959.

(SEAL)
Attest:

KARL H. AXLINE
Attesting Officer

ROBERT C. WATSON
Commissioner of Patents